United States Patent [19]
Bampton et al.

[11] Patent Number: 5,289,967
[45] Date of Patent: Mar. 1, 1994

[54] SYNTHESIS OF METAL MATRIX COMPOSITES BY TRANSIENT LIQUID CONSOLIDATION

[75] Inventors: Clifford C. Bampton; Michael A. Cunningham, both of Thousand Oaks, Calif.

[73] Assignee: Rockwell International Corporation, Seal Beach, Calif.

[21] Appl. No.: 935,760

[22] Filed: Aug. 26, 1992

Related U.S. Application Data

[63] Continuation-in-part of Ser. No. 666,154, Mar. 7, 1991, abandoned.

[51] Int. Cl.⁵ .............................................. B23K 31/02
[52] U.S. Cl. .................................. 228/190; 228/174; 228/195; 228/248.1
[58] Field of Search .......... 228/190, 193, 195, 263.12, 228/174, 191, 192, 194, 245, 248

[56] References Cited

U.S. PATENT DOCUMENTS

| | | | |
|---|---|---|---|
| 3,419,952 | 1/1969 | Carlson | 228/190 |
| 3,609,855 | 10/1971 | Schmidt | 228/190 |
| 3,678,570 | 7/1972 | Paulonis | 29/498 |
| 3,894,677 | 7/1975 | La Iacona | 228/190 |
| 4,614,296 | 9/1986 | Lesgourgues | 228/194 |
| 4,710,235 | 12/1987 | Scruggs | 228/190 |
| 4,762,268 | 8/1988 | Doble | 228/190 |
| 4,934,581 | 6/1990 | Ibe | 228/190 |

FOREIGN PATENT DOCUMENTS 2735638 2/1979 Fed. Rep. of Germany ...... 228/248

Primary Examiner—Kurt C. Rowan
Assistant Examiner—James Miner
Attorney, Agent, or Firm—John C. McFarren

[57] ABSTRACT

A method is provided for fabricating metal matrix composites. Optical or reinforcing fibers, which may be in the form of monofilaments, mats, or tow, are consolidated into a metal matrix alloy. Grooves may be provided in the metal matrix material for holding and positioning the fibers. A transient liquid diffusion bonding agent in the form of a powder may be blended with powdered filler material, such as powdered matrix material, to provide a vehicle for consolidating the fibers into the metal matrix. The fibers and the blended powder are placed between layers of the metal matrix material and the whole structure is heated under minimal pressure to liquefy the bonding agent. The liquid bonding agent wets each fiber and interdiffuses with the matrix material, resulting in rapid isothermal solidification of the alloy and consolidation of the fibers in the matrix.

17 Claims, 2 Drawing Sheets

SYNTHESIS OF METAL MATRIX COMPOSITES BY TRANSIENT LIQUID CONSOLIDATION

RELATED APPLICATION

This application is a continuation-in-part of U.S. patent application Ser. No. 666,154 filed Mar. 7, 1991, now abandoned.

TECHNICAL FIELD

The present invention relates to composite materials and, in particular, to metal matrix fiber composites synthesized by transient liquid consolidation.

BACKGROUND OF THE INVENTION

Composite materials can be designed with properties, such as toughness, high strength, and low weight, that are useful in many applications where homogeneous materials are less effective or inadequate. For example, fiber reinforced materials, a broad class of composites, typically comprise fibers of a material, such as glass or ceramic, that are embedded in a matrix material, such as plastic or metal, to improve the strength of the matrix material. Fabrication of such reinforced materials can often be difficult, however, because of physical incompatibilities between the fibers and the matrix material.

One method of fabricating multiple ply, continuous fiber reinforced metal matrix composites is the so-called foil/fiber/foil process. In this process, reinforcing fibers are sandwiched between layers of a metal foil. Pressure and heat are then applied to the layered structure for solid state consolidation of the fibers into the metal structure.

The basic foil/fiber/foil process, although adequate for consolidation of large diameter fibers in relatively soft metal matrices, has proven unsatisfactory for consolidation of small diameter, brittle fibers, especially in the form of tow, in relatively hard matrix alloys. For example, at the high temperatures, pressures, and exposure times required for consolidation with creep-resistant alloys or other matrix materials that resist diffusion bonding, the reinforcing fibers receive excessive chemical and mechanical damage during the process without becoming fully consolidated within the matrix. Thus, there is a need for new and effective methods of forming metal matrix composites with fully consolidated fibers.

SUMMARY OF THE INVENTION

The present invention comprises a method of consolidating optical or reinforcing fibers in metal matrix materials to form metal matrix composites. Fibers may be provided in the form of monofilaments, mats, or tow and may include a suitable protective coating. A transient liquid diffusion bonding agent, such as silver or nickel-boron eutectic alloy, for example, which may be in the form of a thin foil, a coating, or a powder that may be blended with other materials, is provided as a vehicle for consolidating the fibers into the metal matrix material. The bonding agent is generally selected to have a melting temperature lower than that of the matrix material, good wetting of the fibers in its liquid phase with minimal reaction with the fibers (or fiber coating), high solubility and/or diffusivity in the matrix material, and rapid isothermal solidification upon interdiffusion of the elements of the bonding agent and the matrix material.

The reinforcing fibers and the transient liquid diffusion bonding agent are placed between layers of the metal matrix material to form a layered structure. Matrix alloy foils may include grooves to hold and locate the fibers, which may be placed in the grooves by an automatic drum winding process, for example. The layered structure is then heated under minimal pressure to avoid damage to the fibers. Upon liquefaction, the bonding agent infiltrates the fibers to surround and wet each fiber. At the same time, the elements of the liquid bonding agent and the matrix material interdiffuse to cause rapid isothermal solidification and full consolidation of the fibers in the matrix. Thus, the transient liquid diffusion bonding agent infiltrates the web of fibers, consolidates the fibers into the metal structure, and bonds the layers of matrix material.

A principal object of the invention is consolidation of fibers in a metal matrix to form a composite material. A feature of the invention is a transient liquid diffusion bonding agent, which may be in the form of a foil, a coating, a powder, or a blended powder, that is used to consolidate the fibers within the metal matrix. An additional feature of the invention is the formation of grooves in the matrix material to hold and position the fibers during consolidation. Advantages of the invention include low pressure consolidation, use of high-strength creep-resistant matrix alloys, and minimization of the transient liquid agent necessary to consolidate the fibers within the metal matrix.

BRIEF DESCRIPTION OF THE DRAWINGS

For a more complete understanding of the present invention and for further advantages thereof, the following Detailed Description of the Invention makes reference to the accompanying Drawings, in which.

DETAILED DESCRIPTION OF THE INVENTION

The present invention comprises a method of forming metal matrix composites in which optical or reinforcing fibers are consolidated within the metal matrix. In general, the method is useful for consolidating fibers in metals, such as aluminum alloys, and especially metals that resist solid state diffusion bonding. The method is particularly useful for consolidating fibers, such as alumina fibers ($Al_2O_3$ in polycrystalline or single crystal form) and/or optical fibers, in high-temperature, creep-resistant alloys, such as titanium aluminide alloys (e.g., $\gamma$-TiAl); iron, nickel, and cobalt based superalloys; and iron-aluminide and nickel-alauminide intermetallic alloys, for example.

Figure 1A:
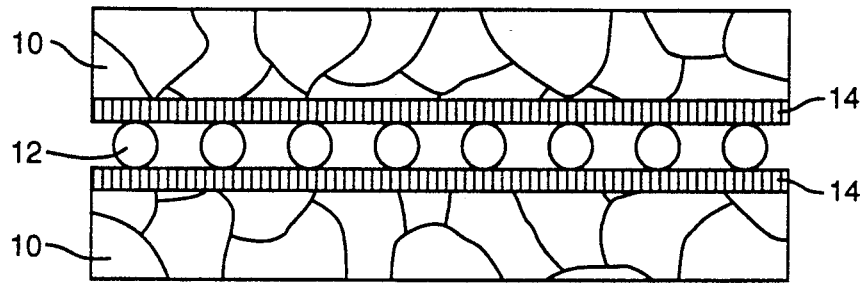
FIGS. 1A-D are schematic cross sections illustrating the basic steps of the present invention in synthesizing a metal matrix composite by transient liquid consolidation.

The basic method of the present invention is illustrate schematically in FIGS. 1A-D. A metal matrix material 10, which is shown with a schematic representation of grain boundaries, is provided in layers such as foil sheets. Optical or reinforcing fibers 12, which may be provided in the form of monofilaments, mats, or tow and which may include a protective coating, are sandwiched between layers of a transient liquid diffusion bonding agent 14. The fiber/bonding agent sandwich is in turn sandwiched between the layers of matrix material 10. Although bonding agent 14 may be applied as a double (as illustrated in FIG. 1A) or a single layer of foil, it may also be applied effectively in various other forms, such as a loose powder, a coating on fibers 12 or the bonding surfaces of matrix 10, or an impregnated layer in the surfaces of matrix 10.

When heated, transient liquid diffusion bonding agent 14 acts as a vehicle for consolidating fibers 12 within matrix 10 by infiltrating the fiber mat or tow, wetting the individual fibers 12, and then isothermally solidifying and diffusing into matrix 10 to bond the layers. For the fabrication of high quality metal matrix composites, it is desirable that transient liquid diffusion bonding agent 14 have the following properties:

1. A melting temperature less than the melting temperature of matrix 10;
2. Good infiltration and wetting of the fibers (or fiber coatings);
3. Minimal dissolution of or reaction with the fibers (or fiber coatings) to avoid degradation of fiber strength and/or formation of brittle interlayers;
4. Rapid isothermal solidification (i.e., steep rise in solidus and liquidus) upon interdiffusion with major matrix alloy elements;
5. High solubility and/or high diffusivity in the matrix alloy (i.e., rapid homogenization);
6. No equilibrium low melting temperature or brittle phases in the homogenized matrix; and
7. A desirable balance of properties in the homogenized matrix alloy.

Figure 1B:
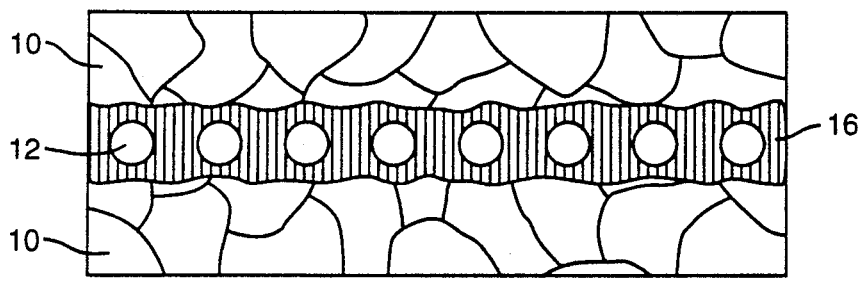
Figure 1C:
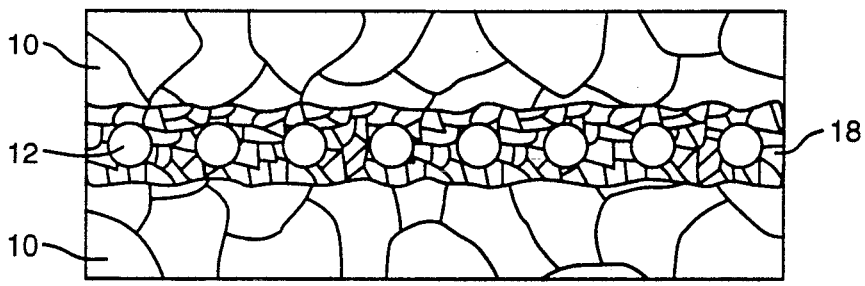
Figure 1D:
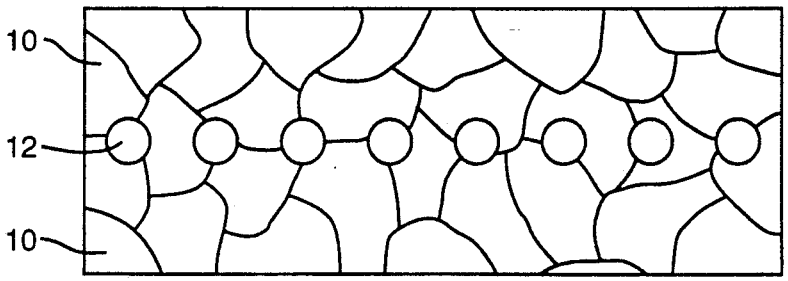

After fibers 12 and transient liquid diffusion bonding agent 14 have been sandwiched between layers of metal matrix 10, the structure is heated under low pressure until bonding agent 14 liquefies to become liquefied bonding agent 16. As shown in FIG. 1B, liquefied bonding agent 16 infiltrates the web of fibers and wets the individual fibers 12. Liquid bonding agent 16 also diffuses into and begins to dissolve the matrix material 10. The wetting of fibers 12 by liquefied bonding agent 16 may be facilitated by the dissolution of active elements from matrix material 10. The process rapidly produces an isothermally solidified, heterogeneous metal matrix 18 around fibers 12, as illustrated in FIG. 1C. Although the production of heterogeneous matrix 18 is essentially isothermal, the temperature and pressure may be varied after liquefaction of bonding agent 16 to achieve desired characteristics of matrix 18. The advantages of rapid, low pressure, essentially isothermal solidification of matrix 18 include full consolidation of and minimal damage to and/or reaction with fibers 12. Furthermore, the selection and use of transient liquid diffusion bonding agent 14 provides control of factors such as the effectiveness of fiber wetting, the bond strength, and the creep resistance of the metal matrix composite, for example. Finally, the structure may be subjected to a temperature and pressure treatment profile, if necessary or desired, to homogenize heterogeneous matrix 18 into homogenous metal matrix 10 around fully consolidated fibers 12, as illustrated in FIG. 1D.

PROCESS EXAMPLE: Gamma TiAl/Al$_2$O$_3$

Metal matrix composites comprising alumina (Al$_2$O$_3$) fibers in a gamma titanium aluminide ($\gamma$-TiAl) matrix have a high strength-to-weight ratio at temperatures up to about 980° C. Alumina fibers, in single crystal (sapphire) or polycrystalline form, are useful for reinforcing high-temperature, creep-resistant metals because of their minimal chemical reactivity and good thermal expansion match with the metal matrix. In addition, polycrystalline alumina fibers having a nominal diameter of approximately 11 μm are available commercially from the 3M Company in the form of a 400-fiber tow.

In the $\gamma$-TiAl/Al$_2$O$_3$ system, silver (Ag) is a preferred metal to act as transient liquid diffusion bonding agent 14. Silver has a convenient melting temperature (962° C.) and a relatively high solubility (about 7% by weight) in both $\gamma$ and $\alpha$-2 phases of TiAl with negligible effect on the relative stabilities of the $\gamma$, $\alpha$-2, and $\beta$ phases of titanium. In addition, silver is relatively soft and compliant and may be applied as an interface material in several different forms, such as foil, powder, or coating, for example.

In one experiment, a tow of alumina fibers and a single layer of 38 μm Ag foil were placed between layers of matrix material cut from a powder-processed, Ti-48Al-2.5Nb-0.3Ta forged alloy. The layered structure was vacuum hot pressed at 1100° C., 34 MPa, for one hour. The liquid silver was very effective in infiltrating the alumina fiber tow and aided in the natural spreading of the fibers along the interface of the two layers of matrix alloy during the hot pressing operation. In addition, X-ray energy dispersive microanalysis indicated that the silver had dispersed very well after isothermal solidification. No silver concentrations higher than 2% by weight could be found, even at the bond line, and silver was detected up to 600 μm from the bond line. Microhardness measurements found no soft regions either close to or distant from the bond line. However, a very hard region was found immediately adjacent to each Al$_2$O$_3$ fiber. Transmission electron microscopy diffraction analysis showed this region to have an $\alpha$-2 crystal structure, which is consistent with the expected dissolution of alumina fibers by the liquid silver after sufficient titanium has dissolved in the liquid to attack the fiber surfaces.

The metal matrix composite produced by the foregoing process was subjected to 100 thermal cycles from room temperature to 980° C. in a vacuum. The thermal cycling did not produce any microcracking around or between the fibers. Although this may indicate that the "reaction" layer of hard $\alpha$-2 is acceptable for a useful composite, various steps have been evaluated for minimizing or eliminating the reaction. The easiest approach is to minimize the dwell time of liquid Ag-Ti on the fiber surfaces. This approach, with careful control of the temperature cycle, has proven somewhat effective in reducing the amount of $\alpha$-2 phase material around the fibers. Another approach, which may be more effective, is to pre-coat the fibers with a thin layer of a suitable protective material. An ideal fiber coating material is one that can be applied conveniently as a thin layer and that survives exposure to the liquid (Ag-$\gamma$-Ti) with just enough reactivity to promote good fiber wetting, but which does not cause significant fiber degradation of the formation of detrimental matrix reaction layers. Various ceramic materials as well as refractory metals, such as niobium (Nb), molybdenum (Mo), tantalum (Ta), tungsten (W), and rhenium (Re), may provide effective fiber coatings. Of the coating materials evaluated, Y$_2$O$_3$ and Er$_2$O$_3$ were only moderately attacked by the liquid bonding agent, and TiB$_2$ was virtually unaffected. A coating of Mo was found to be effective in protecting Al$_2$O$_3$ fibers from the liquid bonding agent even though it reacted to form a new phase around the fibers. At the present time, $TiB_2$ and Mo are considered prime candidates for protective coatings for alumina fibers.

PROCESS EXAMPLE: Incoloy ® 909/$Al_2O_3$

Incoloy ® 909 is an iron based superalloy having a low coefficient of thermal expansion and reasonably good resistance to high-temperature, high-pressure hydrogen embrittlement. Incoloy ® 909 is a candidate for fiber reinforcement because fibers can compensate for the low creep resistance of the alloy at maximum operating temperatures.

In one experiment, alumina fiber tows were placed between layers of Incoloy ® 909. A NIFLEX ™ 77 braze foil (Ni-7Cr-3Fe-4.5Si-3.0B, 58 $\mu m$ thick) was used as the transient liquid diffusion bonding agent 14. Boron (B) and silicon (Si) are the effective melting temperature depressants in this foil for the main superalloy elements of iron (Fe), nickel (Ni), and cobalt (Co). Using the transient liquid consolidation method of the present invention, complete consolidation of the fibers in the Incoloy ® 909 matrix was achieved. There appeared to be no adverse reaction between the liquid metal and the fibers in forming this metal matrix composite. Elevated temperature exposures and thermal cycling of this composite produced no degradation (reaction or cracking) of either the fibers of this composite produced no degradation (reaction or cracking) of either the fibers or the matrix interface region.

Alternatives to NIFLEX ™ 77 foil as the transient liquid diffusion bonding agent 14 may be used to minimize the amount of liquid phase produced at the matrix interfaces and to minimize the modification of the matrix alloy composition. For example, a fine powder of the matrix alloy with sufficient boron and/or silicon added to depress the melting point (i.e., eutectic melting) to a practical consolidation temperature may be prepared by a number of conventional powder processing techniques, such as inert gas atomization. A thin layer of the powder can be applied to the bonding surfaces of the layers of matrix material using an alcohol carrier, for example. The fibers can then be placed between the powder-coated layers of matrix material, and the structure can be processed as described above. The powder can also be applied directly to the fiber monofilaments, mat, or tow. Conventional low-residue organic binder compounds may be used to hold the powder in place during handling of the fibers. A third alternative is to apply a melting point depressant, such as boron, directly to the bonding surfaces of the matrix material in the form of a coating, a powder, or a vapor-impregnation of the matrix material.

The foregoing process examples describe the consolidation of alumina fibers in two significantly different matrix materials, but the process of the present invention is not limited to these specific types of reinforcing fibers or matrix materials. In addition to the titanium aluminide and superalloy materials described above, the matrix material may comprise any of the following: $\alpha$-Ti, $\beta$-Ti, or $\alpha+\beta$-Ti alloys; iron, nickel, and cobalt based superalloys, which generally require Cr, Ti, or Zr to form strong bonds with alumina fibers; high strength aluminum alloys, where the process may be particularly useful for incorporating delicate fibers, such as embedded optical fibers; and iron-aluminide and nickle-aluminide intermetallic alloys, which may include alloying elements such as Ti, Zr, Cr, Fe, and B in small amounts.

Suitable fibers include optical fibers and reinforcing fibers such as polycrystalline and and single crystal $Al_2O_3$, $TiB_2$, and SiC (such as Textron SCS-6), for example. The fibers may include protective coatings such as $TiB_2$, $Y_2O_3$, $Er_2O_3$, or refractory metal (e.g., Nb, Mo, Ta, W, Re), for example. Suitable transient liquid diffusion bonding agents 14 include Ag, Cu, Al, and alloys such as Ti-Cu-Ni, Ag-Al, and Cu-Al, for titanium aluminide matrix alloys; Zn, Mg, Zn-Al, Mg-Al, and Si-Al for aluminum-based matrix alloys; B, Si P, and alloys of these elements (with iron, nickel, and cobalt base materials, for example) as melting temperature depressants for iron, nickel, and cobalt based superalloys and iron-aluminide and and nickel-aluminide intermetallic alloys. With iron-aluminide and nickel-aluminide intermetallic alloys, the bonding agent is typically blended with a superalloy powder. In these composites, the fibers are consolidated in a layer of superalloy material that bonds the intermetallic matrix layers but does not become homogeneous with the matrix layers. However, these composites do provide a higher toughness layer between the nickel or iron aluminide and the reinforcing fibers, materials which currently have low toughness at modest temperatures.

PROCESS EXAMPLE: Blended Powders

The basic transient liquid consolidation process described above is less effective with large diameter fibers (on the order of 150 $\mu m$ diameter, for example) than with small diameter fibers (on the order of 10 $\mu m$ diameter, for example). With large diameter fibers, the inter-fiber gaps, which are bridged by the metal matrix foils prior to consolidation, are correspondingly large. For complete consolidation, such large inter-fiber gaps require larger volumes of a transient liquid bonding agent. This is generally undesirable, however, because the transient liquid bonding agent must be kept to a minimum to achieve the required structural properties in the final metal matrix composite.

The transient liquid bonding agent, which is often applied in powder form in the transient liquid consolidation method of the present invention, may be blended with a powdered filler material, such as powdered metal matrix alloy. When blended in this manner, the transient liquid agent may comprises less than 50 volume % of the blended powder. Because the transient liquid agent is blended with powdered filler material, it has much less volume to fill during the consolidation process. Furthermore, when blended with powdered metal matrix alloy the transient liquid agent has access to an enormously increased surface area of metal matrix for improved inter-diffusion and more rapid isothermal solidification. This reduces the time of exposure of liquid metal to the fiber surfaces and minimizes any damaging chemical reactions.

The technique of blending powdered transient liquid agents with powdered filler materials is believed to be applicable to a board range of agents and materials. By way of example, superalloy powders, such as Haynes alloy 230, may be blended with a superalloy powder having approximately 1-5% boron as a melting point depressant (e.g., Haynes alloy 230 plus 2 wt. % B) for consolidation of alumina fibers with a superalloy metal matrix composite; and silver powder may be blended with a gamma titanium aluminide alloy powder for consolidation of alumina fibers in a titanium aluminide metal matrix composite.

PROCESS EXAMPLE: Grooved Matrix Material

Another limitation of the basic transient liquid consolidation process described above is that it is limited to fabrication of composites having modest fiber fractions by volume. This is inherent in the use of monolithic matrix alloy foils that undergo minimal intrusion from the fibers during the low pressure transient liquid consolidation process. This results in relatively large inter-ply fiber spacing and correspondingly low fiber volume fractions. The inter-ply fiber spacing may be substantially reduced by placing the fibers in grooves formed in the matrix alloy foils.

Grooves may be formed in the metal matrix materials by various methods such as machining, stamping, photolithographic etching, and laser vaporization, for example. The grooves may be formed in any of various shapes, depths, and spacing suitable to hold and position the reinforcing fibers as desired. Placement of the fibers in grooves substantially reduces the inter-ply fiber spacing compared with non-grooved matrix alloy foils. In addition, the use of grooves in the matrix material (as compared with fiber mats held by binders or metallic ribbon inter-weaves) provides more precise and consistent fiber spacing within each ply, less transient liquid bonding agent required for consolidation, and less contamination from binders and inter-weaves. Precise fiber placement in the grooves may be achieved by an automated drum winding technique, for example. Furthermore, grooved matrix materials and drum winding techniques are believed to be applicable to a broad range of materials and fibers. By way of example, alumina fibers may be wound on grooved superalloy foils, such as Haynes alloy 230; and silicon carbide fibers, such as Textron SCS-6 fibers, may be wound on grooved titanium aluminide alloy foils.

The use of grooved matrix materials and blended powders are illustrated schematically and in combination in FIGS. 2A-D. Metal matrix material 20, which is shown with a schematic representation of grain boundaries, is provided in layers such as foil sheets. Reinforcing fibers 22 are provided in the form of monofilaments (which may include a protective coating as described above) and placed in a plurality of spaced-apart grooves 23 formed in the lower layer of matrix material 20. Although not shown, corresponding grooves may also be provided in the upper layer of matrix material 20, if desired. Fibers 22 are sandwiched between the layers of metal matrix material 20 with a filling of powder 24 comprising a powdered transient liquid diffusion bonding agent blended with a filler, such as powdered matrix material, for example. Although illustrated in combination, grooves 23 and blended powder 24 may also be used separately in the transient liquid consolidation process of the present invention.

Figure 2A:
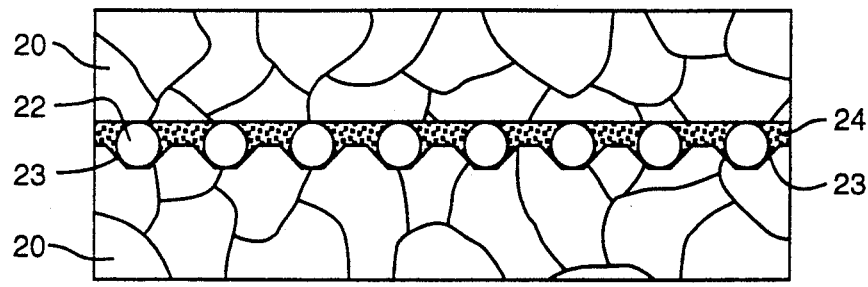
FIGS. 2A-D are schematic cross sections illustrating the transient liquid consolidation technique of the present invention in combination with grooved matrix material and powdered transient liquid bonding agent blended with powdered filler material.
Figure 2B:
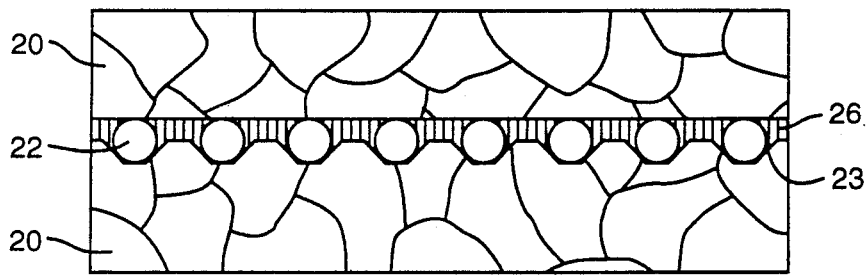
Figure 2C:
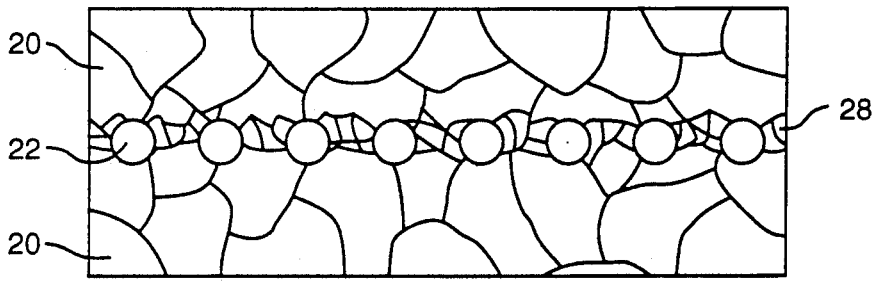
Figure 2D:
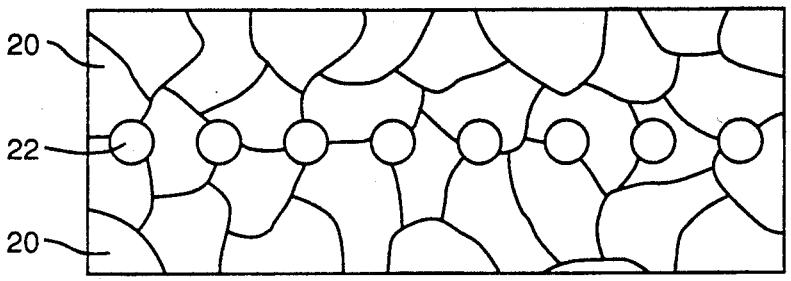

After fibers 22 and powder 24 have been sandwiched between layers of metal matrix 20, the structure is heated under low pressure until the bonding agent blended into powder 24 liquefies. When liquefied, the transient liquid diffusion bonding agent of powder 24 acts as a vehicle for consolidating fibers 22 within matrix 20. As shown in FIG. 2B, the liquefied bonding agent 26 infiltrates the powdered matrix material and wets the individual fibers 22. Liquid bonding agent 26 also diffuses into and begins to dissolve the powdered matrix material and layers 20. The wetting of fibers 22 by liquefied bonding agent 26 may facilitated by the dissolution of active elements from the powdered matrix material. The process rapidly produces an isothermally solidified, heterogeneous metal matrix layer 28 around fibers 22, as illustrated in FIG. 2C. Although the production of heterogeneous matrix layer 28 is essentially isothermal, the temperature and pressure may be varied after liquefaction of bonding agent 26 to achieve desired characteristics of matrix layer 28. The composite structure may be subjected to a temperature/pressure treatment profile, if necessary or desired, to homogenize layer 28 into metal matrix 20 so that homogeneous matrix 20 fully consolidates fibers 22, as illustrated in FIG. 2D.

As stated above, the transient liquid consolidation method of the present invention can be used with a variety of metal matrix composite systems. Manufacturing benefits include low pressure consolidation; use of high-strength creep-resistant matrix alloys; use of fiber monofilaments, mats, or tow; use of bonding agents in various forms such as foils, coatings, and powders (including those blended with powdered filler, such as powdered matrix material); and use of grooves in the matrix material to hold and position the fibers, reduce inter-ply spacing of the fibers, and reduce the amount of transient liquid agent to consolidate the fibers. The quality of metal matrix composites is improved because the process produces less fiber damage and fewer diffusion bonding defects such as voids, oxides, carbides, and intermetallic particles. In addition, the transient liquid consolidation process provides opportunity for control of fiber/matrix wetting, bond strength, and physical properties of the metal matrix composite.

Although the present invention has been described with respect to specific examples thereof, various changes and modifications may be suggested by this disclosure to one skilled in the art. Therefore, it is intended that the present invention encompass such changes and modifications as fall within the scope of the appended claims.

We claim:

1. A method of forming a metal matrix composite, comprising the steps of:
    providing fibers for consolidation within a matrix of metallic material selected from the group of materials consisting of titanium aluminide alloys, superalloys, iron-aluminide and nickel-aluminide alloys, and aluminum alloys;
    selecting a transient liquid diffusion bonding agent from the group of materials consisting of Ag, Cu, Al, Ag-Al, Cu-Al, and Ti-Cu-Ni for titanium aluminide matrix materials; B, Si, P, and alloys thereof for superalloy, iron-aluminide, and nickel-aluminide matrix materials; and Zn, Mg, Zn-Al, Si-Al, and Mg-Al for aluminum alloy matrix materials;
    disposing said fibers and said bonding agent between layers of said matrix material to form a layered structure;
    heating said layered structure to liquefy said bonding agent;
    wetting said fibers with said liquefied bonding agent; and
    isothermally solidifying said bonding agent upon interdiffusion with elements of said matrix material to consolidate said fibers in said metal matrix.

2. The method of claim 1, wherein the step of selecting said transient liquid diffusion bonding agent further comprises the step of providing said bonding agent in powder form.

3. The method of claim 2, wherein the step of providing said bonding agent in powder form further comprises the step of blending said bonding agent powder with a powdered filler material.

4. The method of claim 3, wherein the step of blending said bonding agent powder with a powdered filler material comprises blending said bonding agent powder with powdered matrix material.

5. The method of claim 1, wherein the step of providing fibers further comprises the step of selecting fibers from the group of fibrous materials consisting of alumina ($Al_2O_3$), $TiB_2$, SiC, and optical fibers.

6. The method of claim 5, further comprising the step of coating said fibers with a protective coating selected from the group of materials consisting of Nb, Mo, Ta, W, Re, $TiB_2$, $Y_2O_3$ and $Er_2O_3$.

7. The method of claim 1, further comprising the step of providing grooves in said matrix material for holding and positioning said fibers.

8. The method of claim 7, further comprising the step of placing said fibers in said grooves of said matrix material.

9. The method of claim 8, wherein the step of placing said fibers in said grooves comprises winding said fibers into said grooves.

10. A method of forming a metal matrix composite, comprising the steps of:
    providing at least two layers of metallic matrix material selected from the group consisting of titanium aluminide alloys, superalloys, iron-aluminide and nickel-aluminide intermetallic alloys, and aluminum alloys;
    providing fibers for consolidation within said metallic matrix material;
    providing at least one of said layers of metallic matrix material with grooves for positioning and holding said fibers;
    providing a transient liquid diffusion bonding agent selected from the group of materials consisting of Ag, Cu, Al, Ti-Cu-Ni, Ag-Al, and Cu-Al for titanium aluminide matrix materials; B, Si, P, and alloys thereof for superalloy, iron-aluminide, and nickel-aluminide matrix materials; and Zn, Mg, Zn-Al, and Mg-Al for aluminum alloy matrix materials;
    disposing said bonding agent and said fibers in said grooves between layers of said matrix material to form a layered structure;
    heating said layered structure to liquefy said bonding agent;
    wetting said fibers with said liquefied bonding agent; and
    isothermally solidifying said bonding agent upon interdiffusion with elements of said metallic matrix material to consolidate said fibers in said metal matrix.

11. The method of claim 10, wherein the step of providing said bonding agent comprises providing a bonding agent powder blended with a powdered filler material.

12. The method of claim 11, further comprising the steps of providing powdered metallic matrix material as said filler material and blending said powdered matrix material with said bonding agent powder.

13. The method of claim 10, wherein the step of providing fibers further comprises the step of selecting fibers from the group of fibrous material consisting of alumina ($Al_2O_3$), $TiB_2$, SiC, and optical fibers.

14. The method of claim 13, wherein the step of providing fibers comprises providing fibers having a coating selected from the group of materials consisting of Nb, Mo, Ta, W, Re, $TiB_2$, $Y_2O_3$, and $Er_2O_3$.

15. A method of forming a metal matrix composite, comprising the steps of:
    providing layers of a metallic matrix material selected from the group of materials consisting of titanium aluminide alloys, superalloys, iron-aluminide and nickel-aluminide intermetallic alloys, and aluminum alloys;
    providing fibers for consolidation within said layers of matrix material;
    providing a powdered transient liquid diffusion bonding agent selected from the group of materials consisting of Ag, Cu, Al, Ti-Cu-Ni, Ag-Al, and Cu-Al for titanium aluminide matrix materials; B, Si, P, and alloys thereof for superalloy, iron-aluminide, and nickel-aluminide matrix materials; and Zn, Mg, Zn-Al, and Mg-Al for aluminum alloy matrix materials;
    blending said powdered bonding agent with a powdered filler material to form a blended powder;
    disposing said fibers and blended powder between layers of said matrix material to form a layered structure;
    heating said layered structure to liquefy said bonding agent;
    infiltrating said fibers and said powdered filler material with said liquefied bonding agent;
    forming a bonding alloy by interdiffusion of elements of said bonding agent and said metallic matrix material; and
    isothermally solidifying said bonding alloy to consolidate said fibers.

16. The method of claim 15, wherein the step of providing fibers comprises providing fibers having a coating selected from the group of materials consisting of Nb, Mo, Ta, W, Re, $TiB_2$, $Y_2O_3$, and $Er_2O_3$.

17. The method of claim 16, further comprising the steps of providing grooves in at least one of said layers of said matrix material, and placing said fibers and said powdered bonding agent in said grooves, said grooves holding and positioning said fibers.

* * * * *